Sept. 18, 1962   L. LEHRMANN   3,054,952
SYSTEM FOR MEASURING OR INDICATING THE THREE-PHASE POWER
Filed April 15, 1959
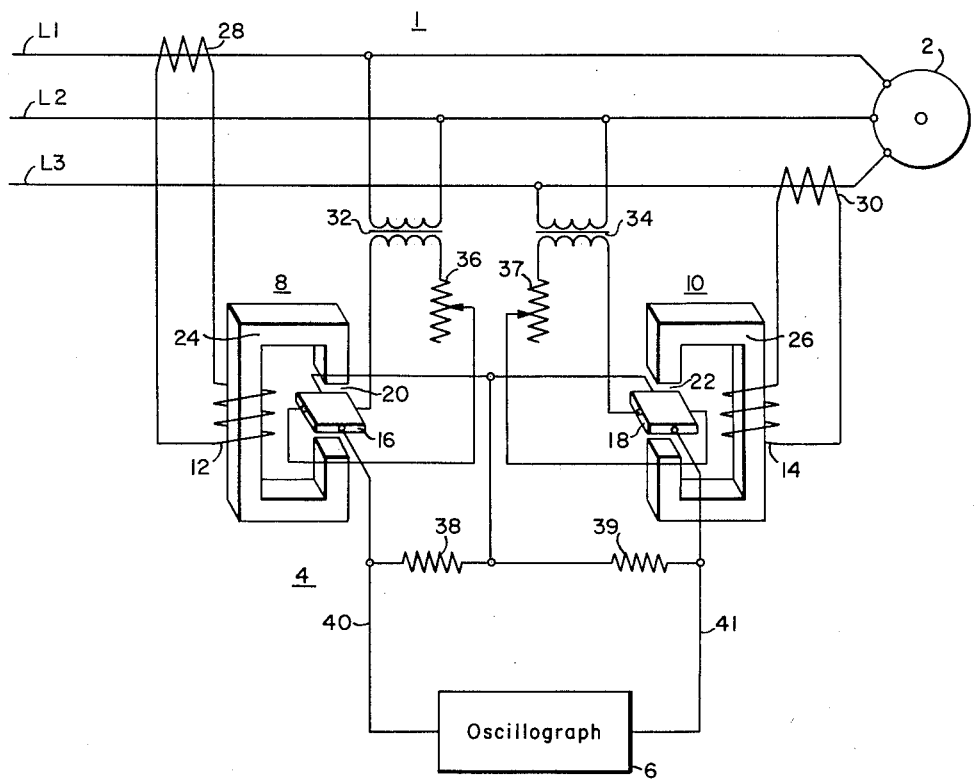
WITNESSES
INVENTOR
Leon Lehrmann
BY
ATTORNEY 3,054,952
SYSTEM FOR MEASURING OR INDICATING THE
THREE-PHASE POWER
Leon Lehrmann, Berlin-Charlottenburg, Germany, assignor to Siemens-Schuckertwerke Aktiengesellschaft, Erlangen, Germany, a corporation of Germany
Filed Apr. 15, 1959, Ser. No. 806,484
Claims priority, application Germany, Apr. 22, 1958
1 Claim. (Cl. 324—107)

This invention relates generally to the measurement of instantaneous electrical characteristics and more particularly to the measurement of such instantaneous characteristics as may transiently appear in a polyphase network.

An object of this invention is to provide a simple and inexpensive network for interconnecting a polyphase supply to an electrical device such as an oscilloscope whereby the electrical transients may be viewed and/or recorded.

A further object is to provide such a system in which the Hall effect is utilized.

A further object is to provide such a network in which, by simple changes, any of current, voltage, or watts may be examined.

Other objects will be apparent from the specification, claim, and the drawing, the single FIGURE of which illustrates diagrammatically a preferred form of the invention.

Referring to the drawing by character of reference, the numeral 1 designates generally a polyphase circuit having the conductors L1, L2, and L3 supplied from a usual source of three-phase electrical energy and connected to a three-phase load diagrammatically indicated at 2.

A measuring network 4 is connected to be energized from the supply lines L1, L2 and L3 and to energize a suitable instrument such as an oscillograph 6 which can be used to examine the electrical characteristics of the load 2. As shown, the network 4 will supply a signal to the oscillograph 6 proportional to watts supplied to the load 2.

More specifically, the network 4 comprises a pair of Hall generators 8 and 10 which have flux producing coils 12 and 14, and Hall plates 16 and 18 located in gaps 20 and 22 provided in the magnetic cores 24 and 26 about which the coils 12 and 14 are wound. The coil 12 is energized from a current transformer 28 while the coil 14 is energized from a current transformer 30.

Potential transformers 32 and 34 are energized by the potential between lines L1 and L2 and lines L2 and L3 respectively. The output of the transformers 32 and 34 are connected in one direction (herein shown as transverse) across the Hall plates 16 and 18. Resistors 36 and 37 are provided to control the response of the plates 16 and 18 to the potential output of the transformers 32 and 34.

The Hall plates 16 and 18 have output connections connected in a second direction (longitudinally) perpendicular to the direction of the connections from the transformers 32 and 34 and respectively to resistors 38 and 39. The resistors 38 and 39 are connected in series and are provided with output lines 40 and 41 connected to the oscillograph 6.

In the described arrangement the oscillograph 6 responds to watts supplied by the polyphase circuit 1 to the load 2. It will be apparent, however, that if desired the coils 12 and 14 could be connected to be energized from the voltage between the lines either in series with or parallel with the voltage supplied to the Hall plates to provide an output which is proportional to a function of the supply voltage or likewise the Hall plates could be supplied from the current transformers 28 and 30 to provide an output signal proportional to a function of the current. Other arrangements could also be made and still come under the generic scope of this invention.

I claim as my invention:

In an electrical network for connection to a three phase three wire network, a pair of Hall generators each having at least one Hall plate and a magnetic field establishing device, a first and a second transformer, each transformer including a first and a second winding, said windings being conductively isolated, means connecting a first of said plates of a first of said generators to said first winding of said first transformer, means connecting said second winding of said first transformer between a first and a second of said network wires whereby the current through said first plate is a function of the voltage between said first and second wires, means connecting a second of said plates of a second of said generators to said first winding of said second transformer, means connecting said second winding of said second transformer between a third of said network wires and said second wire whereby the current through said second plate is a function of the voltage between said third and said second wires, means connecting said device of said first generator to be responsive to the current flow through said first wire and said device of said second generator to be responsive to the current flow through said third wire, a first resistor connected across the output of said first plate, a second resistor connected across the output of said second plate, an output circuit connecting said resistors in series and having output terminals, and a translating device connected across said terminals.

References Cited in the file of this patent
UNITED STATES PATENTS

| 2,545,369 | Millar | Mar. 13, 1951 |
| 2,886,779 | Kuhrt | May 12, 1959 |
| 2,924,775 | Neugebauer | Feb. 9, 1960 |

FOREIGN PATENTS

| 1,010,156 | Germany | June 13, 1957 |
| 1,151,619 | France | Aug. 26, 1957 |
| 1,158,776 | France | Feb. 3, 1958 |
| 802,214 | Great Britain | Oct. 1, 1958 |

OTHER REFERENCES

Publication I, pages 215–218 of the Physical Review, second series, vol. 92, No. 2, Oct. 15, 1953.

Publication II, pages 404–411 of the Physical Review, by Many and Gerlich, vol. 107, Number 2, July 15, 1957.